Nov. 21, 1950   P. S. DEVIRIAN, JR   2,530,941
AXLE MOUNTED POWER TRANSMISSION
AND CASING FOR DRIVE WHEELS
Filed Jan. 27, 1947   2 Sheets-Sheet 2
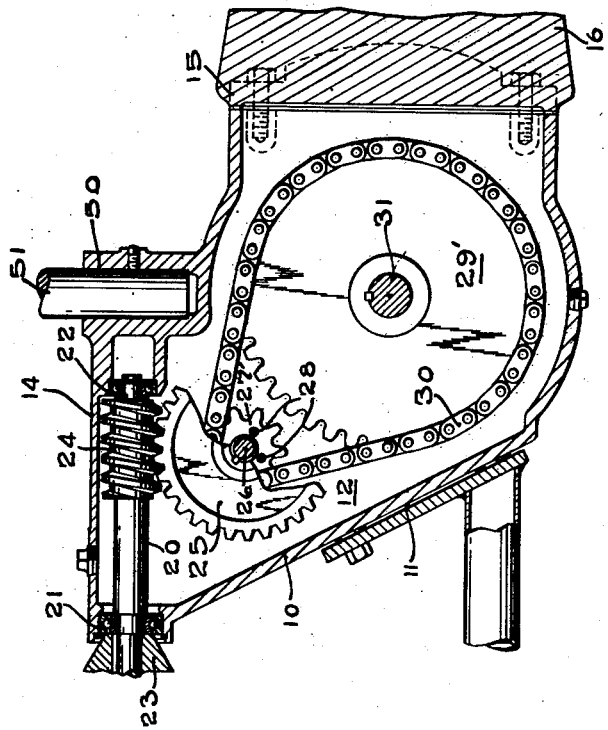
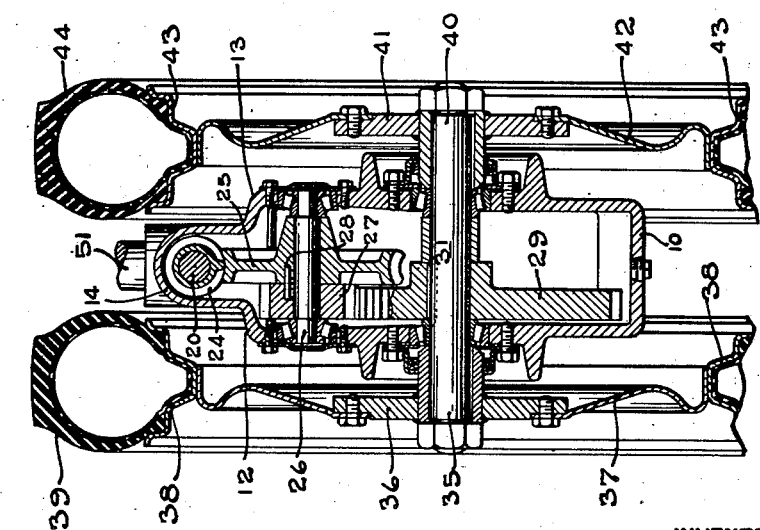
INVENTOR
PHILIP S. DEVIRIAN JR.
BY Philip A. Minnis
Hans G. Hoffmeister
ATTORNEYS Patented Nov. 21, 1950

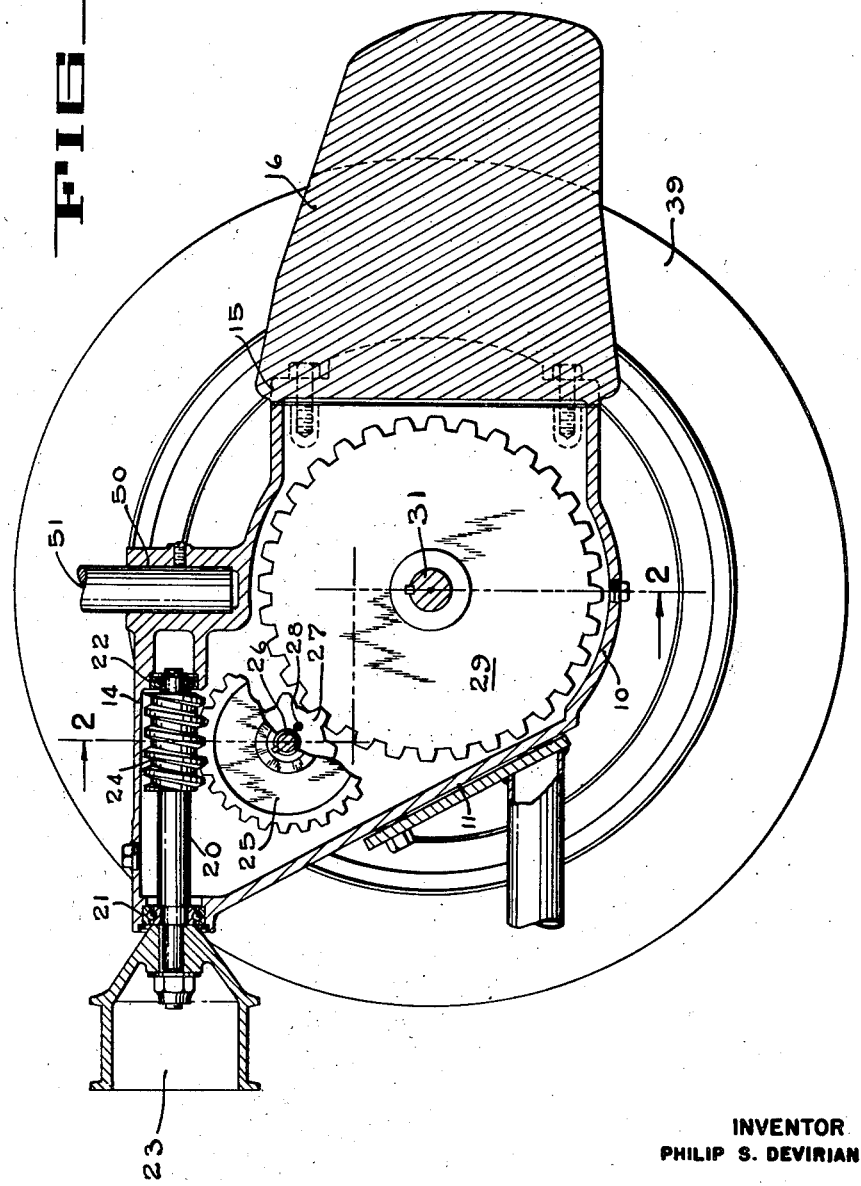

2,530,941

UNITED STATES PATENT OFFICE 2,530,941

AXLE MOUNTED POWER TRANSMISSION AND CASING FOR DRIVE WHEELS

Philip S. Devirian, Jr., San Jose, Calif., assignor to Food Machinery and Chemical Corporation, a corporation of Delaware Application January 27, 1947, Serial No. 724,671

3 Claims. (Cl. 180—42)

The present invention relates to transmission arrangement of the type adapted to supply the power of a drive or propeller shaft to an operational shaft disposed in angular relation thereto.

The present invention aims to provide a system of this type wherein the transmission of power from a drive or propeller shaft to an angularly disposed operational shaft is accomplished with the simplest of means and within a minimum of compass laterally of the drive shaft.

It is, therefore, an object of the present invention to provide a simple and sturdy transmission system of the type referred to which is efficient in operation and compact in construction.

Another object of the present invention is to provide a transmission arrangement adapted to deliver the power of a drive or propeller shaft to a transversely disposed axle within a minimum of space transversely of the propeller shaft.

Another object of the present invention is to provide an inexpensive transmission arrangement of the type referred to, especially for automotive vehicles, which permits the traction wheels to be positioned closely adjacent to the propeller shaft.

Another object of the present invention is to provide a simple and inexpensive transmission arrangement of the type referred to which permits such close mounting of the traction wheels axially thereof as to render differential gearing unnecessary.

Another object of the present invention is to provide a transmission structure for traction mechanisms of the type having two closely spaced traction wheels in such a manner that the broadest portions thereof coincide with concave portions of the traction wheels.

Another object of the present invention is to provide a transmission arrangement of the type referred to, especially for the actuation of the traction wheels of agricultural vehicles, which permits these traction wheels to be mounted at either side of a propeller shaft in closely adjacent relation to one another while providing for the propeller shaft to be positioned at such an altitude relative to the wheels as may be required to furnish adequate ground clearance for operation over rugged fields, brush-land, and the like.

Other objects and advantages of the present invention will become apparent from the following description and drawings which, by way of example, illustrate certain preferred embodiments of the invention as applied to tractors and wherein:

Fig. 1 is a longitudinal section through a tractor transmission assembly embodying the present invention.

Fig. 2 is a cross-section of Fig. 1 taken along line 2—2 thereof.

Fig. 3 is a longitudinal section similar to Fig. 1 illustrating a modified embodiment of the invention.

In the embodiment illustrated in Figs. 1 and 2 a horizontally disposed drive or propeller shaft 20 protrudes into the upper portion of a transmission casing 10 where it is journalled in a bearing 21 located in the extreme forward portion of the casing and a second bearing 22 located in a suitable seat formed in the interior of the casing, as shown in Fig. 1. The exteriorly extending portion of propeller shaft 20 is provided with a pulley 23 firmly mounted thereon, and which is adapted to be driven in either of its two directions by an engine or motor (not shown) that may be supported from the flat surface 11 in the lower front wall of the casing 10.

Interiorly of the transmission casing the propeller shaft 20 carries a worm 24 firmly mounted thereon which meshes with a worm gear 25 rotating on a transverse stub shaft 26. Stub shaft 26 is suitably journalled in the side walls 12 and 13 of the transmission casing 10, as shown in Fig. 2. In addition to worm gear 25, the stub shaft 26 also supports a spur gear 27, and worm gear 25 and spur gear 27 are rigidly held together for movement in unison with one another by means of transverse pins or bolts 28, one of which is shown in Fig. 2.

The spur gear 27 meshes with another spur gear 29 of a materially larger diameter than gear 27 which is keyed on a transverse axle 31 extending parallel to, but below and rearwardly of stub shaft 26, as may best be seen from Fig. 1. The axle 31 is suitably journalled in the side walls 12 and 13 of the transmission casing 10, as shown in Fig. 2. Wheel hubs 36 and 41 are firmly mounted on the protruding ends 35 and 40 of the axle 31 closely adjacent to the exterior of the side walls 12 and 13 of the transmission casing 10, and secured to these hubs are cup shaped supporting discs 37 and 42, respectively, facing with their concave sides the interjacent transmission casing 10. The discs 37 and 42 support fellies 38 and 43, respectively, which carry tires 39 and 44, as shown in Fig. 2.

In operation the worm 24 in combination with the worm gear 25 transmits the rotary movement of the propeller shaft 20 to the spur gear 27 at a reduced rate of speed, due to the size, lead, and number of teeth of worm gear 25. Spur gear 27, in turn, drives the spur gear 29 and thus turns axle 31 and the traction wheels at a still further reduced rate of speed due to the material difference in the diameters of spur gears 27 and 29. Thus, power applied to the pulley 23 on the exterior end of the propeller shaft 20 will turn the traction wheels mounted on the hubs 36 and 41 at a materially reduced speed, the conversion in the direction of rotation and the reduction in the rate of speed with corresponding increase in the traction of the vehicle being accomplished within a space of only a few inches laterally of the drive or propeller shaft, as may clearly be seen from Fig. 2. Consequently, the transmission casing is of a very narrow compass axially of the traction wheels, and since its portion of maximum axial width resulting from worm gear 25 and spur gear 27 in juxtaposition is of such location and extent to coincide with, and fit into, the concave recesses of the wheel discs 37 and 42, as likewise shown in Fig. 2, the traction wheels may be mounted with their tires so closely adjacent to one another that no differential gearing is necessary for satisfactory operation of the traction assembly.

While the specific embodiment illustrated and described will yield a reduction of speed from say 2400 revolutions per minute for the drive shaft 20 to approximately 35 revolutions per minute for the traction wheels, it should be noted that a transmission arrangement constructed in accordance with the present invention may readily be built to yield other rates of speed reduction to suit whatever specific purpose a particular tractor may be designed for. Due to the fact that the worm gear 25 and the spur gear 29 operate in transversely displaced parallel planes, and also due to the longitudinally displaced location of the transverse shafts 26 and 31 which carry the spur gears 27 and 29, both the worm gear 25 and the spur gear 29 may be made of relatively large diameters within the limited space available to establish such high rates of speed reduction as may be desired.

The longitudinally displaced location of the transverse shafts 26 and 31 with the resultant forward displacement of the worm gear 25 as against the lower spur gear 29 has the added advantage of providing space for a cavity 50 formed in the top wall 14 of the transmission casing 10, in substantially vertical alignment with the axle 31 of the traction wheels for the reception of a trunnion post 51 rigidly mounted therein. Trunnion post 51 serves to pivotally connect the tractor assembly described with the main frame of the vehicle (not shown) and form part of the steering mechanism thereof. As a rule, the position of the trunnion post 51 in vertical alignment with the axle 31, and hence with the lowermost points of the traction wheels, will insure maximum maneuverability of the tractor with a minimum of steering effort. For heavy tractors, however, which are intended for operation over soft ground, it may be preferable to locate the steering trunnion 51 somewhat ahead of a position of vertical alignment with the axle 31 since contact between the traction wheels and ground will not be confined to the lowermost points of the traction wheels, but will extend in forward direction therefrom over a small arc due to the fact that the level of the loose ground ahead of the tractor wheels will be higher than that of the compressed ground directly underneath and rearwardly thereof.

In the embodiment illustrated, the transmission casing 10 is cast in a single piece except for its rear wall which is formed by a detachable lid or cover plate 15 bolted to the casting, as shown in Fig. 1. Lid 15 may be provided with a suitable extension 16 of heavy material to provide a counterweight for the engine which is mounted in front of the tractor assembly, as previously indicated, and generally to increase the weight of the tractor and thus improve the traction thereof.

A modified embodiment of my invention is illustrated in Fig. 3, which agrees in all essentials with the embodiment illustrated in Figs. 1 and 2, except that sprockets 27' and 29', operatively connected by a sprocket chain 30, are substituted for the enmeshing spur gears 27 and 29 of the previously described construction.

For lubrication the transmission casing 10 is filled with lubricating oil to a level well up along the flanks of the spur gear 29 or the sprocket 29', respectively. During operation the teeth of the gears or sprockets, and in the modified embodiment also the links of the sprocket chain 30, will carry an adequate amount of oil to the top of the transmission casing to provide proper lubrication of the worm gear transmission 24, 25.

I desire it to be understood that the invention is not limited to the particular application or precise details of construction illustrated, but that various applications, modifications, and variations may be resorted to without departing from the spirit or scope of the invention, and I deem myself entitled to all such applications, modifications, and variations as come within the scope of the claims appended hereto.

Having thus described my invention and the manner in which it is to be performed, what I claim is:

1. A tractor arrangement comprising a flat transmission casing having a narrow top wall, a narrow front wall and a pair of side walls, a horizontally disposed drive shaft protruding into said casing through said front wall and extending longitudinally of said casing closely below said top wall thereof, a worm firmly mounted upon said drive shaft within said casing, a first axle disposed below said worm and extending transversely of said drive shaft, a worm gear in mesh with said worm mounted upon said first axle, a second transverse axle disposed below the level of and in rearwardly displaced relation to said first axle with its opposite ends protruding through the side walls of said casing, said drive shaft being arranged to terminate within said casing at a point in front of a vertical plane containing said second axle, means comprising a toothed rotary element firmly mounted upon said second axle for transmitting the rotary movement of said worm gear to said second axle, means for mounting a steering trunnion in said casing comprising a cavity formed in the said top wall of said casing substantially in vertical alignment with said second axle and extending downwardly below the level of said drive shaft, and traction wheels mounted upon the protruding ends of said second axle for rotation therewith and closely adjacent to the side walls of said casing.

2. A tractor arrangement comprising a flat transmission casing having a narrow top wall, a narrow front wall and a pair of side walls, a horizontally disposed drive shaft protruding into said casing through said front wall and extending longitudinally of said casing closely below said top wall thereof, a worm firmly mounted upon said drive shaft within said casing, a first axle extending below said worm transversely of said drive shaft, a worm gear in mesh with said worm mounted upon said first axle, a spur gear of relatively small diameter mounted upon said first axle and arranged closely adjacent to and for movement in unison with said worm gear, a second transverse axle disposed in rearwardly displaced relation to and below the level of said first axle with its ends protruding through the side walls of said casing, said drive shaft being arranged to terminate within said casing in front of a vertical plane containing said second axle, a second spur gear of relatively large diameter firmly mounted upon said second axle in mesh with said first spur gear, means for mounting a steering trunnion in said casing including a cavity formed in the said top wall of said casing substantially in vertical alignment with said second axle and extending downwards below the level of said drive shaft, and traction wheels firmly mounted upon the protruding ends of said second axle closely adjacent to the side walls of said casing.

3. A tractor arrangement comprising a flat transmission casing having a narrow top wall, a narrow front wall and a pair of side walls, a horizontally disposed drive shaft protruding into said casing through said front wall and extending longitudinally of said casing closely below the said top wall thereof, a worm firmly mounted upon said drive shaft within said casing, a first axle extending below said worm transversely of said drive shaft, a worm gear in mesh with said worm mounted upon said first axle, a sprocket of relatively small diameter mounted upon said first axle and arranged closely adjacent to and for movement in unison with said worm gear, a second transverse axle disposed in rearwardly displaced relation to and below the level of said first axle with its ends protruding through the said side walls of said casing, and drive shaft being arranged to terminate within said casing in front of a vertical plane containing said second axle, a second sprocket of relatively large diameter firmly mounted upon said second axle, a sprocket chain operatively connecting said sprockets, means for mounting a steering trunnion in said casing including a cavity formed in the top wall of said casing substantially in vertical alignment with said second axle and extending downwards below the level of said drive shaft, and traction wheels firmly mounted upon the protruding ends of said second axle closely adjacent to the side walls of said casing.

PHILIP S. DEVIRIAN, Jr.

REFERENCES CITED

The following references are of record in the file of this patent:

UNITED STATES PATENTS

| Number | Name | Date |
|---|---|---|
| 1,511,873 | Davison | Oct. 14, 1924 |
| 1,960,693 | Bryant | May 29, 1934 |
| 1,974,974 | Puffer | Sept. 25, 1934 |
| 1,988,421 | McCann et al | Jan. 15, 1935 |
| 2,015,218 | Dufour | Sept. 24, 1935 |
| 2,241,193 | Garnett et al | May 6, 1941 |
| 2,336,386 | Beck | Dec. 7, 1943 |
| 2,395,333 | Lee | Feb. 19, 1946 |
| 2,398,498 | Funk | Apr. 16, 1946 |
| 2,457,821 | Johnson | Jan. 4, 1949 |

Certificate of Correction

Patent No. 2,530,941 November 21, 1950

PHILIP S. DEVIRIAN, Jr.

It is hereby certified that error appears in the printed specification of the above numbered patent requiring correction as follows:

Column 6, line 8, for "and drive" read *said drive*;

and that the said Letters Patent should be read as corrected above, so that the same may conform to the record of the case in the Patent Office.

Signed and sealed this 6th day of November, A. D. 1951.

[SEAL]

THOMAS F. MURPHY,
*Assistant Commissioner of Patents.*